United States Patent [19]

Losic et al.

[11] Patent Number: 5,034,872
[45] Date of Patent: Jul. 23, 1991

[54] CURRENT-FREE SYNTHESIS OF IMPROVED PARAMETER-FREE ZERO-IMPEDANCE CONVERTER

[76] Inventors: Novica A. Losic, 4755-79 St., Kenosha, Wis. 53142; Ljubomir D. Varga, Deskaseva 6, 11000 Beograd, Yugoslavia

[21] Appl. No.: 564,573

[22] Filed: Aug. 9, 1990

[51] Int. Cl.$^5$ .................... H02M 3/335; G05F 1/575
[52] U.S. Cl. ...................... 363/21; 363/97; 323/285; 323/286; 323/351; 318/811; 388/811
[58] Field of Search .................... 363/21, 97; 323/285, 323/286, 287, 282, 351; 318/811; 388/811

[56] References Cited

U.S. PATENT DOCUMENTS

| | | | |
|---|---|---|---|
| 4,293,812 | 10/1981 | Kubach et al. | 323/286 X |
| 4,456,872 | 6/1984 | Froeschle | 363/21 X |
| 4,672,518 | 6/1987 | Murdock | 363/21 |
| 4,686,617 | 8/1987 | Colton | 363/21 X |
| 4,837,495 | 6/1989 | Zansky | 323/285 X |
| 4,885,674 | 12/1989 | Varga et al. | 323/285 X |

Primary Examiner—William H. Beha, Jr.
Assistant Examiner—Emanuel Todd Voeltz

[57] ABSTRACT

A method of synchesizing a system which effectively forces finite value of an impedance to zero comprising a most inner positive voltage feedback loop and an inner negative voltage feedback loop and an outer negative voltage feedback loop, whereby a voltage difference between the most inner positive feedback loop and the inner negative feedback loop is fed back to compensate for the voltage drop across the impedance of interest in both steady state and transient and whereby no current through the impedance is sensed and no parameters of the impedance including parameters of the plant under the control are required to be known implying minimization of measurement noise and adaptive/self-tuning operation, respectively, in applications in which the method is used to synthesize load independent switch mode power converters and electric motor drive systems, incorporating any kind of motor, of infinite disturbance rejection ratio and zero order dynamics.

7 Claims, 2 Drawing Sheets

CURRENT-FREE SYNTHESIS OF IMPROVED PARAMETER-FREE ZERO-IMPEDANCE CONVERTER

FIELD OF THE INVENTION

This invention relates to circuits and systems and more particularly to electric motor drive systems and switch mode power converters using a current-free and improved parameter-free zero-impedance converter to provide for an infinite disturbance rejection ratio and zero order dynamics in the former case and a load independence in the latter case without sensing and processing a current through the impedance of interest and without knowledge about resistive and reactive values of the impedance of interest including parameters of the plant under the control.

BACKGROUND OF THE INVENTION

In the circuit and system theory and in practice it is of interest to minimize an impedance of interest. Further in order to achieve mathematically complete, and thus ideal, load independent operation, it can be shown that an impedance of interest should be forced to zero. All known techniques produce less or more successful minimization of the impedance of interest, usually in proportion to their complexity. None of the presently known techniques produces a zero impedance, except synthesis methods described in copending and coassigned applications by these two same inventors Lj. Dj. Varga and N. A. Losic, "Synthesis of Zero-Impedance Converter", Ser. Nr. 07/452,000, December 1989, N. A. Losic and Lj. Dj. Varga, "Synthesis of Improved Zero-Impedance Converter", Ser. Nr. 07/457,158, December 1989, allowed for Issuance June 1990, N. A. Losic and Lj. Dj. Varga, "Parameter-Free Synthesis of Zero-Impedance Converter", Ser. Nr. 07/484,494, February 1990, and N. A. Losic and Lj. Dj. Varga, "Current-Free Synthesis of Parameter-Free Zero-Impedance Converter", Ser. Nr. 07/503,229, April 1990. A specific and particular applications of a zero-impedance converter, in addition to those in the applications above, are described in the U.S. Pat. No. 4,885,674 "Synthesis of Load-Independent Switch-Mode Power Converters" by Lj. Dj. Varga and N. A. Losic, December 1989, as well as in two copending and coassigned applications of N. A. Losic and Lj. Dj. Varga, "Synthesis of Load-Independent DC Drive System", Ser. Nr. 07/323,630, November 1988, and "Synthesis of Load-Independent AC Drive Systems", Ser. Nr. 07/316,664, February 1989, allowed for Issuance December 1989.

Another advantage due to the use of the zero-impedance converter, seen in creating possibility to reduce order of an electric motor drive system to zero by implementing appropriate (feed) forward algorithms in addition to realizing the zero-impedance converter to produce a load independent operation, is explored and described in a copending application Ser. No. 07/468,122 by N. A. Losic and Lj. Dj. Varga "Synthesis of Drive Systems of Infinite Disturbance Rejection Ratio and Zero-Order Dynamics/Instantaneous Response", January 1990. Furthermore, a generalized synthesis method to produce zero order dynamics, i.e., instantaneous response, and infinite disturbance rejection ratio in a general case of control systems of n-th order is described in a copending and coassigned application by Lj. Dj. Varga and N. A. Losic, "Generalized Synthesis of Control Systems of Zero-Order/Instantaneous Response and Infinite Disturbance Rejection Ratio", Ser. Nr. 07/479,275, February 1990.

The zero impedance converter and its particular and specific applications, as described in the patents/patent applications on behalf of these two inventors listed above, except the patent application Ser. No. 07/484,494 and patent application Ser. No. 07/503,229, operate on specific (given) values of resistive and reactive parts of an impedance of interest. In the Application No. 07/484,494, a parameter-free algorithm is based on current and voltage measurements in real time. A current-free synthesis method of a parameter-free zero-impedance converter, whereby no current is measured and processed and no parameters of the impedance of interest are needed to be known, is disclosed in application Ser. No. 07/503,229.

SUMMARY OF THE INVENTION

It is therefore an object of the present invention to provide a current-free synthesis method for synthesizing an improved parameter-free zero-impedance converter, which includes elimination of differentiation in cases of inductive impedances (in cases of capacitive impedances an integration rather than a differentiation is used in the synthesis), to produce a current-free and improved parameter-free zero-impedance converter, operating without knowledge about resistive and reactive parts of the impedance of interest and of any other parameters of the plant under the control and without sensing and processing a current through the impedance of interest. Such a synthesized current-free and improved parameter-free zero-impedance converter is used to achieve an infinite disturbance rejection ratio enabling further zero-order synthesis in electric motor drive systems, using any kind of motor, as well as to achieve a load independence in switch mode power converters. These applications are not exclusive; the current-free and improved parameter-free zero-impedance converter can be used in any application which can make use of its properties.

Briefly, for use with switch-mode power converters, the preferred embodiment of the present invention includes a most inner positive voltage feedback loop and an inner negative voltage feedback loop and an outer negative voltage feedback loop wherein the voltage difference between the most inner positive loop and the inner negative loop being fed back effectively compensates for the total voltage acting across the output filter inductor impedance providing for independence of both complex load and output filter parameters as well as of a voltage gain transfer function of a pulse width modulation (PWM) stage used in the switch-mode power converters.

For use with electric motor drive systems, another preferred embodiment of the present invention includes a most inner positive voltage feedback loop and an inner negative voltage feedback loop and an outer negative voltage feedback loop, whereby the two latter loops are velocity loops, so that the total voltage effectively acting across the motor impedance is fed back as a difference between the voltage supplied by the most inner positive loop and the voltage supplied by the inner negative loop thus effectively cancelling the voltage drop across the motor impedance of interest. In addition to providing, in this way, for an infinite disturbance rejection ratio, the scheme described also reduces the order of the system transfer function making it possible to further reduce it to zero by incorporating (feed) forward algorithms to be shown. The same applies to the preferred embodiment of the present invention in the field of switch-mode power converters.

The synthesis method presented in the embodiments provides for operation outside of the switching (PWM) environment as the sensed variables are those which are well behaved and/or well filtered and, further, no differentiation is performed, which provides for a noise- and ripple-free operation, i.e., no current through the impedance of interest is sensed and processed. The algorithms of the synthesis method provide also independence from the impedance parameters and remaining parameters of the plant under the control as well as from a transfer function of the PWM control and power stage thus constituting an ultimate and ideal control in that they provide for the ideal system performance with respect to both load disturbance/change and input command response while, at the same time, continuously adapting themselves in case of the changes of the parameters of the impedance of interest and parameters of the plant under the control and the changes of the transfer function of the PWM control and power stage.

The ability to provide a current-free and improved parameter-free zero-impedance converter, operating in the way described above, is a material advantage of the present invention. Other advantages of the present invention include its ability to be realized in an integrated-circuit form; the provision of such a method which needs not specifying the resistive and reactive parts of the impedance of interest including the remaining parameters of the plant under the control and transfer function of the PWM control and power stage; the provision of such a method which provides zero output-voltage-change-to-load-change transfer function in case of power converters; the provision of such a method which provides zero output-angular-velocity/position-change-to-load-torque-change transfer function as well as constant output-angular-velocity/position-change-to-input-command-change transfer function in case of electric motor drive systems; the provision of such a method which provides constant output-voltage-to-reference-voltage transfer function in case of power converters; and the provision of such a method which simplifies design of negative voltage feedback loop.

The circuit realization of the algorithm of the current-free and improved parameter-free zero-impedance converter reduces to implementing constant-gain circuits and arithmetic (summing) circuits. The circuit realization of the (feed) forward algorithms also reduces to implementing constant-gain circuits.

In case of application to electric motor drive systems, the algorithms are independent of mechanisms of a torque production, these mechanisms being nonlinear in some electric motors, as well as they are independent of a system moment of inertia and of a viscous friction coefficient and of nonlinear effects associated with the dynamical behavior of the drive system within its physical limits. The independence of the system moment of inertia implies infinite robustness of the drive system with respect to this parameter.

These and other objects and advantages of the present invention will no doubt be obvious to those skilled in the art after having read the following detailed description of the preferred embodiments illustrated in the FIGURES of the drawing.

DETAILED DESCRIPTION

Figure 1:
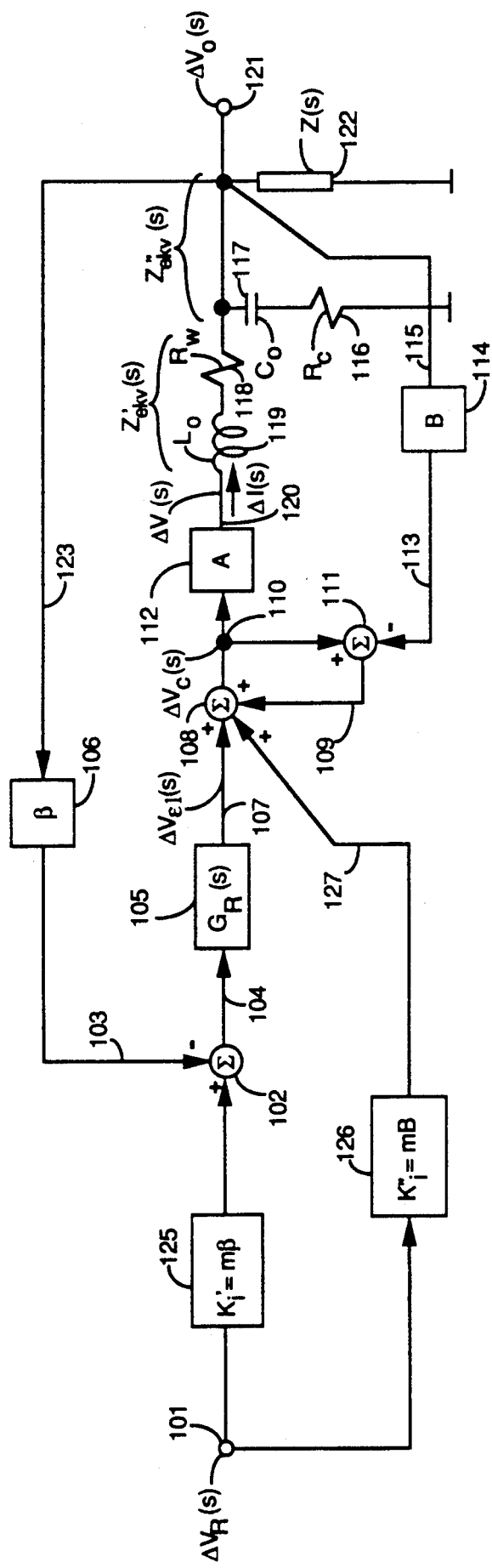
FIG. 1 is a block and schematic diagram of a first embodiment of the invention.

A current-free and improved parameter-free zero-impedance converter embodying the principles of the invention applied to synthesizing a load independent power converter and, at the same time, of a constant transfer function from reference voltage to output voltage, is shown in FIG. 1. In FIG. 1, A characterizes transfer function of a PWM control and power stage 112. As it will be shown in the course of analysis of the converter in FIG. 1, the algorithms to be obtained are independent of A. A signal $\Delta V_c(s)$ present at point 110 is thus voltage-amplified A times to appear as voltage $\Delta V(s)$ on lead 120 with an associated power/current $\Delta I(s)$ supplied by a source of electrical energy of a constant voltage $V_{in}$ (not illustrated) at an input to a power stage within the block 112. Although a dc-to-dc converter has been assumed within block 112, the principles of the embodiment equally apply to other converter types.

In FIG. 1, the current-free and improved parameter-free zero-impedance converter has its input applied by means of lead 107 (assuming a feedforward path denoted with lead 127 disconnected), i.e., a processed error signal $\Delta V_\epsilon(s)$ acts as an input to the zero-impedance converter while its output is the output dc voltage $\Delta V_o(s)$ at terminal 121. The remaining portion of the embodiment of FIG. 1 is due to the application of the current-free and improved parameter-free zero-impedance converter in synthesizing a load invariant power converter and of a constant transfer function between a reference voltage $\Delta V_R(s)$, applied to terminal 101, and the output voltage $\Delta V_o(s)$ at 121.

The current-free and improved parameter-free zero-impedance converter employs a most inner positive voltage feedback loop and an inner negative voltage feedback loop and an outer negative voltage feedback loop. A voltage difference between the signals provided by the most inner positive feedback loop and the inner negative feedback loop is obtained at lead 109 as a resulting total voltage. The resulting total voltage, available on lead 109, is therefore obtained as a result of subtracting a processed output voltage signal, available on lead 113, from a resulting total control signal, available at point 110 and denoted $\Delta V_c(s)$, in a voltage algebraic summer 111. The outer negative feedback loop may in general case incorporate a voltage sampling network 106 which is resistive network of transfer function $\beta$. The inner negative feedback loop incorporates in general another voltage sampling circuit, here specifically called a voltage gain circuit 114 whose gain is denoted B. The generality of the two gain constants, $\beta$ and B, does not exclude their equality, i.e., $\beta = B$, as a possible case. The purpose of the most inner positive feedback loop and the inner negative feedback loop is to synthesize in a current-free and improved parameter-free manner the zero-impedance converter with respect to an output lowpass filter inductor impedance $Z_{ekv}'(s)$, which is effectively forced to zero by the action of these two loops, and to enable the synthesis for a constant transfer function from $\Delta V_R(s)$ to $\Delta V_o(s)$, i.e., $\Delta V_o(s)/\Delta V_R(s) = m$ for incorporating two (feed) forward constants $K_i'$ and $K_i''$ as illustrated in FIG. 1. The purpose of the outer negative feedback loop is to additionally stabilize the system and control its dynamics by means of a stabilizing network 105 of transfer function $G_R(s)$ as well as to maintain a proportional relationship between the output voltage $\Delta V_o(s)$ and the reference voltage $\Delta V_R(s)$.

In operation, the current $\Delta I(s)$ flows through the output filter inductor whose impedance is $Z_{ekv}'(s)$. The output filter consists of inductor of inductance 119 whose value is $L_o$ and resistance 118 whose value is $R_w$, and capacitor of capacitance 117 whose value is $C_o$ and equivalent series resistance 116 whose value is $R_c$. A complex load impedance 122 of value $Z(s)$ is connected in parallel with the output filter capacitor and this parallel connection is of value $Z_{ekv}''(s)$. The output filter inductor current $\Delta I(s)$ supplies impedance $Z_{ekv}''(s)$, providing for an output dc voltage $\Delta V_o(s)$ at terminal 121. A sample of the output voltage is fed back in both the outer loop, through voltage sampling network 106, and the inner loop, through voltage gain circuit 114. The output voltage, fed back via 123 by the outer loop, as a sampled voltage signal available on lead 103 is compared in an algebraic summing circuit 102 with a direct path signal $K_i'\Delta V_R(s)$ of direct path circuit 125, to produce an error signal on lead 104 proportional to a difference between the direct path signal $K_i'\Delta V_R(s)$, available at the output of the direct path circuit 125, and the sampled voltage signal $\beta\Delta V_o(s)$, available on lead 103. The error signal, available on lead 104, is processed in a stabilizing network 105 to produce a processed error signal $\Delta V_\epsilon(s)$ on lead 107.

A resulting total voltage is obtained by subtracting a processed output voltage signal, on lead 113, from a resulting total control signal $\Delta V_c(s)$, at 110, in a voltage algebraic summer 111. The resulting total voltage, available on lead 109, is added in a positive feedback manner, via lead 109, to the processed error signal $\Delta V_\epsilon(s)$, provided by lead 107, in a summing circuit 108, and to a feedforward signal, available on lead 127, in the same summing circuit 108, producing the resulting total control signal $\Delta V_c(s)$ at point 110. The processed output voltage signal, available on lead 113, is obtained by passing, via lead 115, dc voltage $\Delta V_o(s)$, available at terminal 121, through a voltage gain circuit 114 whose gain is a constant B. The feedforward signal, available on lead 127, is obtained by applying the reference voltage $\Delta V_R(s)$ at the input of a feedforward circuit 126 of constant gain $K_i''$. Similarly, the direct path signal is obtained at the output of a direct path circuit 125 whose input is fed by the reference voltage $\Delta V_R(s)$. The resulting total control signal $\Delta V_c(s)$, available at point 110, is applied to a pulse width modulation control and power stage 112 where it is voltage amplified A times appearing as voltage $\Delta V(s)$ on lead 120. The voltage $\Delta V(s)$ is controlled but unfiltered. The lowpass filtering of voltage $\Delta V(s)$ is done in the output filter described previously yielding the output dc voltage $\Delta V_o(s)$ at terminal 121.

The embodiment in FIG. 1 operates in such a way as to force the effects due to the output filter inductor impedance $Z_{ekv}'(s)$ to zero by compensating for the voltage drop $\Delta V(s) - \Delta V_o(s)$ across the impedance $Z_{ekv}'(s)$. In doing this, an independence of the parameters of the output filter inductor, $L_o$ and $R_w$, (as well as of the parameters $C_o$ and $R_c$ of the output filter capacitor) and of the transfer function A of the PWM control and power stage (as well as of the transfer function of stabilizing network $G_R(s)$ is effected. For example, if the output voltage $\Delta V_o(s)$ is either higher or lower from the value required to cancel the voltage drop $\Delta V(s) - \Delta V_o(s)$ across the impedance of the output filter inductor $Z_{ekv}'(s)$, the processed output voltage signal $B\Delta V_o(s)$, available on lead 113 as output from the voltage gain circuit 114, will also become proportionally higher or lower causing proportionally lower or higher, respectively, voltage $\Delta V(s)$ and consequently voltage $\Delta V_o(s)$ which will result in an exact amount of the resulting total voltage being eventually fed back and cancelling the voltage drop across the output filter inductor impedance $Z_{ekv}'(s)$. The action of the outer negative voltage feedback loop, closed through the voltage sampling network 106 of transfer function $\beta$, supports the above described action of the two inner loops, maintaining a proportional relationship between the reference voltage $\Delta V_R(s)$ and the output voltage $\Delta V_o(s)$. As seen from FIG. 1 and the above description of the functioning of the embodiment, no current through the impedance $Z_{ekv}'(s)$ needs to be sensed/processed in addition to a complete parameter-free operation implying minimization of measurement noise and adaptive/self-tuning operation, respectively. By forcing the effects (voltage drop) due to the output filter inductor impedance $Z_{ekv}'(s)$ to zero in the above described action, an independence from the (changes of) complex load impedance $Z(s)$ is achieved. This action additionally enables a synthesis for a constant transfer function from the reference voltage $\Delta V_R(s)$ to the output voltage $\Delta V_o(s)$, i.e., $\Delta V_o(s)/\Delta V_R(s) = m$, by incorporating a direct path circuit of transfer function $K_i' = m\beta$ and a feedforward circuit of transfer function $K_i'' = mB$, as it will be shown.

A mathematical analysis of the embodiment of FIG. 1 follows.

In FIG. 1, $Z_{ekv}'(s) = R_w + sL_o$ and $Z_{ekv}''(s) = [R_c + (1/sC_o)] || Z(s)$.

From FIG. 1, (assuming the feedforward gain constant $K_i'' = 0$)

$$\Delta V_c(s) = \Delta V_\epsilon(s) + \Delta V_c(s) - B\Delta V_o(s)$$

yielding for the transfer function of the current-free and improved parameter-free zero-impedance converter $$\Delta V_o(s)/\Delta V_\epsilon(s) = 1/B \qquad (1)$$

The transadmittance of the current-free and improved parameter-free zero-impedance converter of FIG. 1 thus is $$\Delta I(s)/\Delta V_{\epsilon 1}(s) = [\Delta V_o(s)/\Delta V_{\epsilon 1}(s)]/[\Delta V_o(s)/\Delta I(s)] = \qquad (2)$$
$$= [1/B]/[Z_{ekv}''(s)] = 1/[BZ_{ekv}''(s)]$$

Eq. (1) implies independence of the embodiment of FIG. 1 both from load $Z(s)$ and from the parameters of the output filter $L_o$, $R_w$, $C_o$ and $R_c$. (The independence from the output filter parameters is to be understood in terms of control of the embodiment in FIG. 1, i.e., in that no time constants and associated phase shifts are introduced by the output filter components in the outer negative feedback control loop but, of course, the output filter components, inductor and capacitor, are needed to perform the lowpass filtering to obtain the required output dc voltage $\Delta V_o(s)$). Eq. (1) also implies that the electrical time constants due to the output filter reactive components are reduced to zero while keeping finite loop gain! The loop gain in the outer negative feedback loop is $$LG(s) = \beta G_R(s)/B \qquad (3)$$

Eq. (3) implies a perfectly stable system wherein transfer function $G_R(s)$ is simply designed for any desired gain/phase margin. As the power converters are, generally, a regulator-type control systems, i.e., systems whose reference input ($\Delta V_R(s)$) does not change, it follows that by eliminating the load dependency, as it has been done here, and by eliminating dependence on input (line) voltage variations implicitly in the embodiment in FIG. 1 by eliminating dependence on transfer function of PWM control and power stage (represented, for simplicity, by a gain constant A but, in general, a complex function A(s) can be used), the design of the negative outer feedback loop can be greatly simplified which reduces to a great simplification in designing block 105 which has been denoted by a complex transfer function $G_R(s)$ for generality reasons.

The above mentioned independence from gain of the PWM control and power stage A, which in general may be complex function A(s) due to a transport lag of the PWM stage, as demonstrated by Eqs. (1) through (3), constitutes the complete (improved) parameter-free nature of operation of this embodiment which, therefore, operates independently from the parameters of the output filter and the value of gain of PWM control and power stage.

By incorporating the direct path circuit 125, of constant gain $K_i'$, and the feedforward circuit 126, of constant gain $K_i''$, an additional synthesis for a zero order transfer function from the reference voltage $\Delta V_R(s)$ to the output voltage $\Delta V_o(s)$, is performed next.

Using the derivations so far, resulting in Eq. (1), the transfer function of the embodiment of FIG. 1 is $$\Delta V_o(s)/\Delta V_R(s) = [K_i'' + K_i' G_R(s)]/[B + \beta G_R(s)] \qquad (4)$$

The transfer function in Eq. (4) becomes of a zero order, i.e., a constant, for the values of the gain constants $$K_i' = m\beta \qquad (5)$$

$$K_i'' = mB \qquad (6)$$

in which case $$\Delta V_o(s)/\Delta V_R(s) = m \qquad (7)$$

Eq. (7) implies an instantaneous and proportional relationship between the applied reference voltage and the output dc voltage. This relationship is independent of load and of parameters of the output filter and voltage gain of the PWM control and power stage.

If the derivation included more details it could have been easily seen that, with reference to Eq. (2), an infinite transadmittance part, equal to $1/[B(Z_{ekv}'(s) - Z_{ekv}'(s))] = \infty$, is in series with a finite transadmittance part, given by Eq. (2), so that the total transadmittance is equal to the finite transadmittance part preserving a finite loop gain and thus stability while the infiniteness of the infinite transadmittance part has been actually "utilized" to reduce all time constants and corresponding phase lags, associated with the elements of the output filter, to zero.

It has been shown that the characteristics of the embodiment of FIG. 1, expressed in Eqs. (1), (2), (3) and (7), have been obtained without: (a) sensing current through either output lowpass filter inductor impedance $Z_{ekv}'(s)$ or through complex load Z(s) (or, for that matter, through the filter capacitor), (b) processing signals from the switched (PWM) domain with associated noise and ripple problems, (c) using differentiation, and (d) knowing parameters of the output filter, transfer function (voltage gain) of the PWM control and power stage, and transfer function of the stabilizing network $G_R(s)$.

Figure 2:
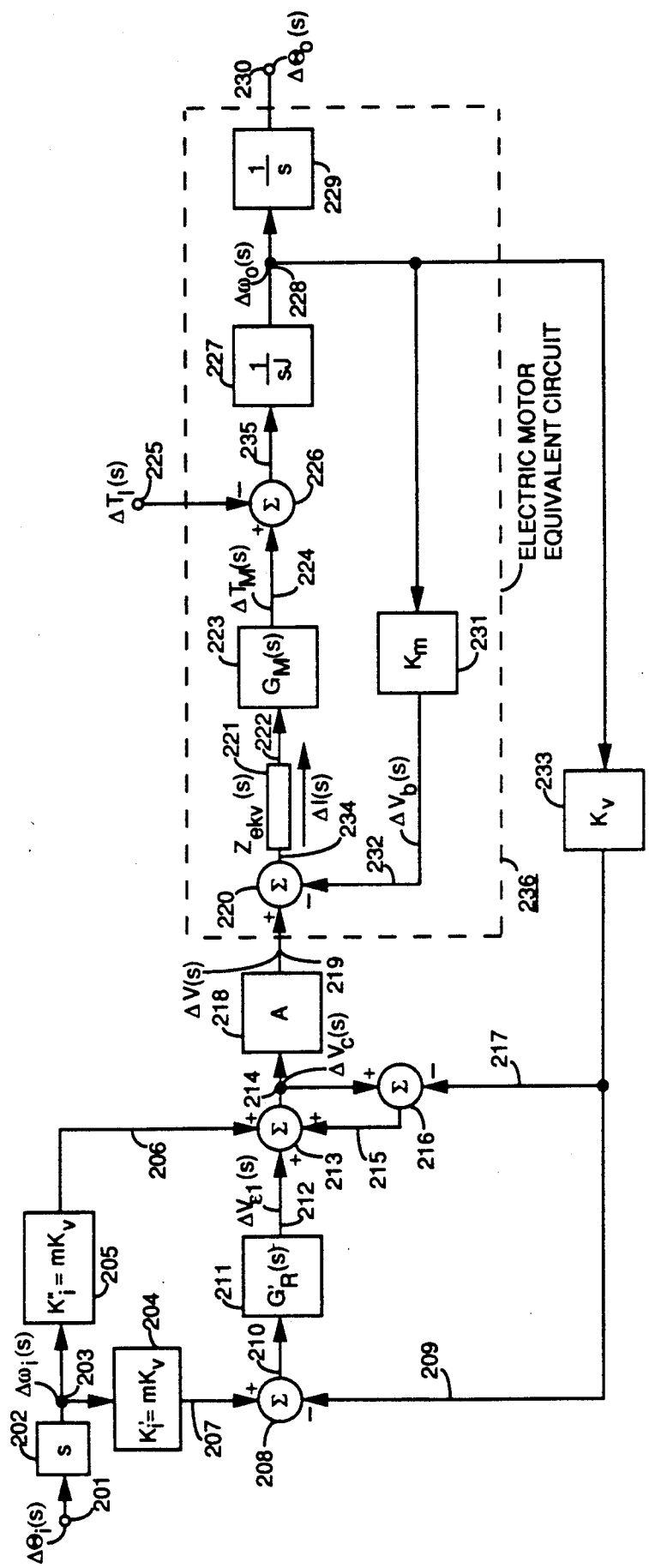
FIG. 2 is a block diagram of another embodiment of the invention.

A current-free and improved parameter-free zero-impedance converter embodying the principles of the invention applied to synthesizing electric motor drive systems of infinite disturbance rejection ratio and zero order dynamics is shown in FIG. 2.

In FIG. 2, A denotes a voltage gain of PWM control and power stage 218. The power stage within block 218 is implemented appropriately for the kind of motor which it powers; for example, it may be a dc-to-dc converter for dc motors or a dc-to-ac converter for ac motors or a PWM power stage employed for driving step motors (in this latter case some additional circuits may be used without affecting the properties of the embodiment). The PWM control portion within block 218 then performs appropriate control function. What is of interest is that a signal $\Delta V_c(s)$ on lead 214 is voltage-amplified A times to appear as voltage $\Delta V(s)$ on lead 219 with an associated power/current supplied by a source of electrical energy of a constant voltage $V_{in}$ (not illustrated) at an input to a power stage within the block 218.

In FIG. 2, the current-free and improved parameter-free zero-impedance converter receives its input via lead 212 (assuming a feedforward path denoted with lead 206 disconnected), i.e., a control signal $\Delta V_{ef}(s)$ acts as an input to the zero-impedance converter while its output is an angular shaft speed $\Delta \omega_o(s)$, or corresponding position $\Delta \theta_o(s)$. The remaining portion of the embodiment of FIG. 2 is due to the application of the current-free and improved parameter-free zero-impedance converter in synthesizing electric motor drive systems of infinite disturbance rejection ratio and zero order dynamics.

The embodiment of FIG. 2 employs a most inner positive voltage feedback loop and an inner negative voltage feedback loop and an outer negative voltage feedback loop. The two negative feedback loops are realized through use of a tach 233 of gain constant $K_v$[V/rad/sec]. A voltage difference between the signals provided by the most inner positive feedback loop and the inner negative feedback loop is obtained on lead 215 as a resulting total voltage. Thus the resulting total voltage is obtained subtracting a tach signal, available on lead 217, from a resulting total control signal, available at point 214 and denoted $\Delta V_c(s)$, in a voltage algebraic summer 216. The outer negative feedback loop is closed by means of lead 209 which supplies the tach signal. The purpose of the most inner positive feedback loop and the inner negative feedback loop is to synthesize in a current-free and improved parameter-free manner the zero-impedance converter with respect to a motor equivalent impedance $Z_{ekv}(s)$, seen between applied voltage to the motor $\Delta V(s)$ and a back emf $\Delta V_b(s)$, the impedance being effectively forced to zero by the action of these two loops, and to enable for the synthesis for a constant transfer function from $\Delta \theta_i(s)$ to $\Delta \theta_o(s)$, i.e., $\Delta\theta_o(s)/\Delta\theta_i(s)=m$, by incorporating two (feed) forward constants $K_i'$ and $K_i''$ as illustrated in FIG. 2. The purpose of the outer negative feedback loop is to additionally stabilize the system and control its dynamics by means of a stabilizing and control block 211 of transfer function $G_R'(s)$ as well as to maintain a proportional relationship between the output angular shaft position $\Delta\theta_o(s)$, at point 230, and the position command $\Delta\theta_i(s)$, at point 201. The constant $K_i'$ characterizes a velocity direct path circuit consisting of a differentiation operator 202 and the associated differentiating time constant 204. Similarly, the constant $K_i''$ characterizes a feedforward circuit consisting of the differentiation operator 202 and the associated differentiating time constant 205. A voltage command $\Delta V_i(s)$ (not shown) actually represents the position command $\Delta\theta_i(s)$, so that, alternatively, a velocity signal voltage, denoted $\Delta\omega_i(s)$ and available at point 203, may be considered as a voltage command corresponding to a velocity command and obtained differentiating the voltage command $\Delta V_i(s)$ corresponding to the position command $\Delta\theta_i(s)$ in which case (case of having already differentiated position command available in terms of voltage at point 203) the constants associated with blocks 204 and 205 are dimensionless, i.e., in [V/V].

In operation, the current $\Delta I(s)$ flows through an electric motor equivalent impedance $Z_{ekv}(s)$ numbered 221. The equivalent impedance $Z_{ekv}(s)$ is the one seen between the voltage applied to the motor $\Delta V(s)$ and the back emf $\Delta V_b(s)$ and it normally consists of resistive and inductive components. Its value is not needed to be known for the purposes of the synthesis of embodiment in FIG. 2, which constitutes a parameter-free feature of the embodiment. Neither the current $\Delta I(s)$ flowing through the motor impedance $Z_{ekv}(s)$ needs to be measured/processed which constitutes a current-free feature of the embodiment. A motor developed torque $\Delta T_M(s)$ is produced on the basis of the motor current $\Delta I(s)$. The torque producing mechanisms are represented by a block 223 of transfer function $G_M(s)$. In case of n-phase motors, a total current $\Delta I(s)$ is understood to be on lead 222 as an input to block 223. As it will be shown, the algorithms of the embodiment in FIG. 2 are independent of the torque producing mechanisms so that these mechanisms were represented by the (linear) Laplace-transformed function $G_M(s)$ even though in some motors these mechanisms are nonlinear. The current $\Delta I(s)$ is therefore obtained due to a voltage difference $\Delta V(s)-\Delta V_b(s)$, existing on lead 234, acting upon the motor equivalent admittance $1/Z_{ekv}(s)$ to produce $\Delta I(s)$ which in turn produces motor torque $\Delta T_M(s)$ on lead 224 by means of a torque producing mechanisms 223 denoted $G_M(s)$. The motor developed torque $\Delta T_M(s)$ is opposed by a load torque $\Delta T_l(s)$, supplied externally at point 225. This opposition takes place in an algebraic summer 226. The difference between the two torques, $\Delta T_M(s)-\Delta T_l(s)$, is supplied by lead 235 to a block 227 which denotes transformation from a torque to an angular shaft speed, and whose transfer function is $1/sJ$, where J is a system moment of inertia. Normally, block 227 has a transfer function $1/(sJ+B)$ where B is a viscous friction coefficient. However, as it will be shown, the algorithms of the embodiment of FIG. 2 are independent of the transfer function of block 227, whether it is expressed as $1/sJ$ or $1/(sJ+B)$, implying infinite robustness of the system to the mechanical parameters. An angular shaft speed $\Delta\omega_o(s)$ is produced at point 228 while an angular shaft position $\Delta\theta_o(s)$ is produced, integrating the speed in block 229, at point 230. A back emf $\Delta V_b(s)$ is produced on lead 232 opposing voltage applied to the motor $\Delta V(s)$, available at point 219. This opposition is mathematically represented by subtracting the back emf from the voltage applied to the motor in an algebraic summer 220. The back emf is produced in proportion to the angular speed, where the constant of proportionality is a constant $K_m$, shown in block 231, for a constant air-gap flux in an electric motor, regardless of the type of motor. It should be understood that the back emf results into a reduced average (dc) voltage applied to the motor impedance $Z_{ekv}(s)$ in case of dc motor and, in cases of ac and step motors, it reduces a peak-to-peak, and thus rms, voltage applied to the motor impedance $Z_{ekv}(s)$. The portion within broken line in FIG. 2, referred to with numeral 236, thus represents an electric motor equivalent circuit. It will be shown that the algorithms of the current-free and improved parameter-free zero-impedance converter are independent from any of these motor parameters/mechanisms within the equivalent circuit 236. It will also be shown that they are additionally independent from a voltage gain A characterizing PWM control and power stage as well as from the transfer function of a stabilizing and control block 211, denoted $G_R'(s)$.

The angular shaft speed $\Delta\omega_o(s)$ is sensed by tach 233 and the tach signal is applied as a velocity feedback signal via leads 217 and 209 to close the inner and the outer negative feedback loops, respectively. A velocity signal voltage represented as $\Delta\omega_i(s)$ and available at point 203 in a form of voltage obtained by differentiating the voltage command $\Delta V_i(s)$ corresponding to the position command $\Delta\theta_i(s)$, is passed through a velocity direct path circuit 204 of gain $K_i'$. A velocity command voltage is provided on lead 207 at the output of the velocity direct path circuit 204. The velocity feedback signal on lead 209 is subtracted in an algebraic summer 208 from the velocity command voltage on lead 207 producing a resulting error voltage on lead 210. The resulting error voltage is brought with lead 210 to a stabilizing and control circuit 211 of transfer function $G_R'(s)$ at whose output 212 a control signal $\Delta V_\epsilon(s)$ is produced. The control signal is added in a positive manner to a feedforward signal, available on lead 206, in a summer 213. The feedforward signal on lead 206 is available at the output of a feedforward circuit 205 characterized by a gain constant $K_i''$ fed at its input by the velocity signal voltage $\Delta\omega_i(s)$. It should be understood that the feedforward signal increases a dc voltage applied to the motor impedance $Z_{ekv}(s)$ in case of a dc motor, and in cases of ac and step motors it increases a peak-to-peak, and thus rms, voltage applied to the motor impedance $Z_{ekv}(s)$, i.e., the feedforward signal opposes action of the back emf $\Delta V_b(s)$.

The resulting total voltage obtained, as described earlier, by subtracting the velocity feedback signal (tach signal) on lead 217 from the resulting total control signal $\Delta V_c(s)$ sampled from point 214, in a voltage algebraic summer 216, is then added in a positive feedback manner via lead 215 to the control signal $\Delta V_\epsilon(s)$, on lead 212, and the feedforward signal, on lead 206. The addition of the three signals is done in summer 213 whose output provides the resulting total control signal $\Delta V_c(s)$ at point 214. The resulting total control signal $\Delta V_c(s)$, at point 214, is applied to a pulse width modulation control and power stage 218 where it is voltage amplified A times appearing as voltage $\Delta V(s)$ on lead 219 which, opposed by the back emf $\Delta V_b(s)$ inherently produced within a motor on lead 232, creates motor current $\Delta I(s)$ through the motor equivalent impedance $Z_{ekv}(s)$.

Similarly as explained in connection with FIG. 1, the embodiment in FIG. 2 operates in such a way as to force the effects due to the equivalent motor impedance $Z_{ekv}(s)$ to zero by compensating for the voltage drop $\Delta V(s) - \Delta V_b(s)$ across the impedance $Z_{ekv}(s)$. In this action, an independence from the parameters of the impedance as well as from the remaining parameters of the plant under the control is achieved. For example, if the angular shaft speed $\Delta\omega_o(s)$ is either higher or lower from the value required to cancel the voltage drop $\Delta V(s) - \Delta V_b(s)$, (by producing the velocity feedback signal at the tach output and completing the processing as explained in the description of the embodiment), across the equivalent impedance $Z_{ekv}(s)$, the velocity feedback signal $K_v\Delta\omega_o(s)$, available as the tach signal on lead 217, will also become proportionally higher or lower causing proportionally lower or higher, respectively, voltage $\Delta V(s)$ and consequently the angular shaft speed $\Delta\omega_o(s)$ which will result in an exact amount of the resulting total voltage being eventually fed back and cancelling the voltage drop across the motor equivalent impedance $Z_{ekv}(s)$. The action of the outer negative (velocity) feedback loop, closed by means of lead 209, supports the above described action of the two inner loops, maintaining a proportional relationship between the output angular shaft speed $\Delta\omega_o(s)$ (or position $\Delta\theta_o(s)$) and the velocity signal voltage $\Delta\omega_i(s)$ (or position command $\Delta\theta_i(s)$).

As mentioned earlier, the implementation of the PWM control and power stage 218, as well as the value of its gain A, is irrelevant for the functioning of the embodiment of FIG. 2. It is understood that signals associated with the summing circuit 213 are compatible in that they are ac or dc varying signals such that the PWM control portion within block 218 operates on appropriate control signals for the PWM processing, i.e., a dc varying signal and a triangular (or sawtooth) carrier signal for producing PWM waveform for dc motors, or an ac varying sinusoidal signal or pulse signal and a carrier for producing PWM waveform for ac or step motors, respectively. Thus, the voltage supplied to the motor $\Delta V(s)$ is in a pulse width modulated form whose average (dc) value corresponds to a voltage effectively seen by a dc motor; its fundamental component corresponds to a sinusoidal voltage effectively seen by an ac motor; and its pulsed waveform, free from the actual pulse width modulation, is seen by a step motor.

The scaling constant m in blocks 204 and 205 has units in [radian/Volt] for a voltage command $\Delta V_i(s)$ (not shown in FIG. 2) actually representing the position command $\Delta\theta_i(s)$. In such a case, and since the tach constant $K_v$ is dimensioned in [V/rad/sec], blocks 204 and 205 are dimensioned in [sec], representing time constants. However, the differentiation operator s in block 202 is dimensioned in [1/sec] so that the velocity command voltage on lead 207 and the feedforward signal on lead 206 are expressed in Volts for the voltage command $\Delta V_i(s)$, representing the position command $\Delta\theta_i(s)$, applied at point 201 in Volts. (The extraction of the differentiation operator s, in block 202, in front of, in this case, time constants $K_i'$ and $K_i''$, is purely mathematical; physically, $sK_i'$ and $sK_i''$ blocks, being dimensionless, i.e., dimensioned in [V/V], are realized for this case of applying voltage command in Volts at point 201). Alternatively, the scaling constant m in blocks 204 and 205 is dimensioned in [rad/sec/V] in case of the velocity signal voltage $\Delta\omega_i(s)$ being applied in Volts at point 203, so that blocks 204 and 205 become dimensionless, i.e., dimensioned in [V/V], representing a constant-gain blocks. (In connection with the embodiment of FIG. 1, the scaling constant m in blocks 125 and 126 is dimensionless, i.e., dimensioned in [V/V], and since also $\beta$[V/V] and B[V/V], the blocks 125 and 126 are realized as a constant-gain circuits of gains $K_i'$[V/V] and $K_i''$[V/V], respectively).

A mathematical analysis of the embodiment of FIG. 2 follows. (Assume $K_i''=0$ for now).

From FIG. 2, $$\Delta V_c(s) = \Delta V_{\epsilon l}(s) + \Delta V_c(s) - K_v\Delta\omega_o(s)$$

yielding for the transfer function of the current-free and improved parameter-free zero-impedance converter $$\Delta\omega_o(s)/\Delta V_{\epsilon l}(s) = 1/K_v \quad (8)$$

The transadmittance of the current-free and improved parameter-free zero-impedance converter of FIG. 2 thus is $$\Delta I(s)/\Delta V_{\epsilon l}(s) = [\Delta\omega_o(s)/\Delta V_{\epsilon l}(s)]/[\Delta\omega_o/\Delta I(s)] = \\ = [1/K_v]/[(1/sJ)G_M(s)] = 1/[K_v(1/sJ)G_M(s)] \quad (9)$$

Similarly, it is easily derived for a transfer function of the embodiment in FIG. 2 (for $K_i'' \neq 0$)

$$\Delta\theta_o(s)/\Delta\theta_i(s) = [G_R'(s)K_i' + K_i'']/\{[G_R'(s)+1]K_v\} \quad (10)$$

while the dynamic stiffness is easily shown to be $$-\Delta T_l(s)/\Delta\theta_o(s) = \{[G_R'(s)+1]s\}/\{(1/sJ)-(1/sJ)\} \\ = \infty \quad (11)$$

Eq. (11) implies that a disturbance rejection ratio, defined as $D_{rr}(s) = \Delta\theta_{oi}(s)/\Delta\theta_{ol}(s)$ where $\Delta\theta_{oi}(s)$ is a part of the angular shaft position response due to the input position command in Eq. (10), and $\Delta\theta_{ol}(s)$ is a part of the output angular shaft position response due to the load torque distrubance in Eq. (11), is $$D_{rr}(s) = \infty \quad (12)$$

Eq. (10) implies that for $$K_i' = K_i'' = mK_v \quad (13)$$

the transfer function of the embodiment in FIG. 2 becomes constant $$\Delta\theta_o(s)/\Delta\theta_i(s) = m \quad (14)$$

with associated zero order dynamics.

Eq. (8) implies that all electrical and mechanical time constants in the system in FIG. 2 are reduced to zero while keeping finite loop gain! The velocity loop gain is $$LG_v(s) = K_vG_R'(s)(1/K_v) = G_R'(s) \quad (15)$$

Eq. (15) implies a perfectly stable system wherein transfer function $G_R'(s)$ is simply designed for any desired gain/phase margin. The design of transfer function $G_R'(s)$ is actually very much simplified as the embodiment of FIG. 2 is made of infinite disturbance rejection ratio, Eq. (12), and of zero order dynamics, Eq. (14), independently of the transfer function $G_R'(s)$. Eq. (8) also implies independence from gain of the PWM control and power stage A as well as from any of the parameters/mechanisms incorporated within the plant under the control (existing in the motor equivalent circuit 236).

With more details during the derivation of Eq. (9) it could have been easily seen that an infinite transadmittance part, equal to $K_m/\{K_v[Z_{ekv}(s)-Z_{ekv}(s)]\} = \infty$, is in series with a finite transadmittance part, given by Eq. (9), so that the total transadmittance is equal to the finite transadmittance part preserving a finite loop gain and thus stability while the infiniteness of the infinite transadmittance part has been actually "utilized" to reduce all electrical and mechanical time constants to zero.

It has been shown that the characteristics of the embodiment of FIG. 2, expressed in Eqs. (8), (9), (12), (14) and (15), have been obtained without: (a) sensing current through the motor impedance $Z_{ekv}(s)$, (b) processing signals from the switched (PWM) domain with associated noise and ripple problems, (c) using differentiation, and (d) knowing parameters of the motor impedance $Z_{ekv}(s)$ including mechanisms of torque and back emf production and mechanical parameters, transfer function (voltage gain) of the PWM control and power stage, and transfer function of the stabilizing and control circuit $G_R'(s)$.

Various changes and modifications may be made, and features described in connection with any one of the embodiments may be used with any others within the scope of the inventive concept.

For example, the applications of a current-free and improved parameter-free zero-impedance converter to a capacitive impedance may be performed without departing from the scope of the inventive concept.

Also, the applications in cases of inductive impedances are not limited to those described in this application (switch mode power converters and electric motors). They are possible whenever the properties of the current-free and improved parameter-free zero-impedance converter, described here, are needed.

As another example, the scaling constant m, conceptually employed in the signal portions of the respective embodiments, may easily be moved to a power portion of an embodiment, in order to facilitate higher voltage levels (when multiplying with m), without affecting any of the properties of the embodiments. The scaling constant m can be moved to increase, for example, the voltage gain of the PWM stage for, of course, keeping loop gains unchanged and resulting in the same sets of final equations as shown here.

We claim:

1. A method for current-free synthesizing improved parameter-free zero-impedance converter comprising:
   accepting a source of electrical energy of a constant voltage at an input,
   coupling through an output filter to a load to be energized at an output,
   controlling a power flow from said input to said output,
   modulating a power converter for the control of said power flow in a pulse width modulation manner,
   supplying a resulting total control signal for modulating said power converter,
   supplying a reference voltage,
   passing said reference voltage through a direct path circuit;
   thereby producing a direct path signal,
   passing said reference voltage through a feedforward circuit; thereby producing a feedforward signal,
   sampling a voltage across said load,
   feeding back a sampled voltage signal in a negative feedback loop with respect to said direct path signal and summing said sampled voltage signal and said direct path signal,
   passing a signal obtained as an algebraic sum of said sampled voltage signal and said direct path signal through a stabilizing network; thereby producing a processed error signal proportional to a difference between said direct path signal and said sampled voltage signal,
   passing the sampled voltage across said load through a voltage gain circuit; thereby producing a processed output voltage signal,
   sampling said resulting total control signal,
   subtracting said processed output voltage signal from the sampled resulting total control signal in a voltage algebraic summer; thereby producing a resulting total voltage,
   feeding back said resulting total voltage in a positive feedback loop with respect to said processed error signal and said feedforward signal and summing said processed error signal and said resulting total voltage and said feedforward signal,
   supplying said resulting total control signal, obtained as the sum of said processed error signal and said resulting total voltage and said feedforward signal, for modulating said power converter for the control of the flow of power from the input electrical source to the output load, whereby impedance of an inductor of said output filter is being forced to zero making said voltage across said load independent of said load in a current free manner with respect to a current through said inductor of said output filter and a parameter free manner with respect to parameters of said output filter and a gain of said power converter and making a transfer function from said reference voltage to said voltage across said load a constant in said current free manner and said parameter free manner.

2. The method of claim 1 wherein said voltage gain circuit is physically implemented as a constant gain circuit.

3. The method of claim 1 wherein said direct path circuit is physically implemented as a circuit of constant gain $$K_i' = m\beta$$

in said constant gain m being a scaling constant equal to said transfer function from said reference voltage to said voltage across said load, and $\beta$ being a gain constant of a voltage sampling network.

4. The method of claim 1 wherein said feedforward circuit is physically implemented as a circuit of constant gain $$K_i'' = mB$$

in said constant gain m being a scaling constant equal to said transfer function from said reference voltage to said voltage across said load, and B being a gain constant of said voltage gain circuit.

5. A method for current-free synthesizing improved parameter-free zero-impedance converter comprising:

accepting a source of electrical energy of a constant voltage at an input, coupling mechanically a shaft of an electric motor to a load to be driven at an output, controlling a power flow from said input to said output, modulating a power converter for the control of said power flow in a pulse width modulation manner, supplying a resulting total control signal for modulating said power converter, supplying a velocity signal voltage obtained as a differentiated position command, passing said velocity signal voltage through a velocity direct path circuit; thereby producing a velocity command voltage, passing said velocity signal voltage through a feedforward circuit; thereby producing a feedforward signal, supplying a velocity feedback signal, feeding back said velocity feedback signal in a negative feedback loop with respect to said velocity command voltage and summing said velocity feedback signal and said velocity command voltage; thereby producing a resulting error voltage, passing said resulting error voltage through a stabilizing and control circuit; thereby producing a control signal proportional to the algebraic sum of said velocity command voltage and said velocity feedback signal, sampling said resulting total control signal, sensing an angular shaft speed of said electric motor by a tach; thereby producing said velocity feedback signal, subtracting said velocity feedback signal from the sampled resulting total control signal in a voltage algebraic summer; thereby producing a resulting total voltage, feeding back said resulting total voltage in a positive feedback loop with respect to said control signal and said feedforward signal and summing said resulting total voltage and said control signal and said feedforward signal, supplying said resulting total control signal, obtained as the sum of said control signal and said feedforward signal and said resulting total voltage, for modulating said power converter for the control of the flow of power from the input electrical source to the output mechanical load, whereby impedance of said electric motor is being forced to zero making an angular shaft position and speed independent of said load in a current free manner with respect to a current through said electric motor and a parameter free manner with respect to electrical and mechanical parameters of said electric motor and a gain of said power converter and making a transfer function from said position command to said angular shaft position a constant and therefore of zero order in said current free manner and said parameter free manner.

6. The method of claim 5 wherein said velocity direct path circuit is physically implemented as a circuit of constant gain $$K_i' = mK_v$$

in said constant gain m being a scaling constant equal to said transfer function from said position command to said angular shaft position, and $K_v$ being a tach constant.

7. The method of claim 5 wherein said feedforward circuit is physically implemented as a circuit of constant gain $$K_i'' = mK_v$$

in said constant gain m being a scaling constant equal to said transfer function from said position command to said angular shaft position, and $K_v$ being a tach constant.

* * * * *